Dec. 10, 1935. J. O. EISINGER ET AL 2,023,920
WATER COOLING SYSTEM FOR INTERNAL COMBUSTION ENGINES
Filed March 25, 1933    2 Sheets-Sheet 1

Inventors:-
John O. Eisinger
Edward R. Barnard
BY
Bruce K. Brown
ATTORNEY

Dec. 10, 1935.  J. O. EISINGER ET AL  2,023,920
WATER COOLING SYSTEM FOR INTERNAL COMBUSTION ENGINES
Filed March 25, 1933  2 Sheets-Sheet 2

Inventors:-
John O. Eisinger
Edward R. Barnard
BY Bruce K. Brown
ATTORNEY

Patented Dec. 10, 1935

2,023,920

UNITED STATES PATENT OFFICE 2,023,920

WATER COOLING SYSTEM FOR INTERNAL COMBUSTION ENGINES

John Overton Eisinger and Edward R. Barnard, Whiting, Ind., assignors to Standard Oil Company, Chicago, Ill., a corporation of Indiana Application March 25, 1933, Serial No. 662,683

14 Claims. (Cl. 123—174)

Our invention relates to improvements in water cooling systems for internal combustion engines and more particularly to cooling systems of the type employed in motor vehicles.

Heretofore water cooling systems for motor vehicle engines have been constructed in such a manner as to conduct water from the water jacket of the engine under the influence of the engine water pump directly into the upper portion of the cooling radiator where it may pass through the radiator core to give off its heat and thereupon return to the water jacket through the engine water pump. This arrangement has resulted in the passage of scale, rust, grease and other sludge formed in the engine water jacket into the relatively small conducting passageways and tubes of the radiator core, to cause the passageways and tubes to become partially clogged and in many cases completely blocked thereby greatly decreasing the efficiency of the cooling system.

Furthermore, in the event that water in the relatively small passageways and tubes of the radiator core freezes through winter exposure, hot water and steam from the engine jacket, subsequent to the starting of the engine, is conducted directly into the upper portion of the radiator core where it may have little or no effect as a thawing agent, largely due to the fact that the passageway and tubes of the radiator core usually freeze first in the lower region of the radiator.

An object of our invention is to provide an improved water cooling system for motor vehicle engines incorporating apparatus for entrapping rust, scale and other sludge formed in the engine water jacket, in the water conducting passageway between the engine jacket of the radiator where it may be removed from time to time, thereby precluding the congestion or blocking of the radiator.

Another object is to provide, in a water cooling system for motor vehicle engines, means for utilizing the heat transferred to the water in the engine jackets for thawing frozen tubes and passageways in the radiator core.

A further object is to provide, in a cooling system, as described, means for relieving steam pressure which may be present in the water jackets of the engine in the event that the water conducting passageway between the engine and the radiator becomes partially obstructed by ice as in freezing weather.

Other objects, the advantages and uses of the invention will become apparent after reading the following specification and claims and after consideration of the drawings forming a part of this application in which:

In general, the apparatus selected for illustration herein comprises a motor vehicle engine A, of the internal combustion type, having a water outlet B and a water inlet C communicating with the water jackets of the engine (not shown), a radiator core D, of conventional type, having an outlet E in its lower end directly connected with the engine inlet C and means providing a U shaped passageway F between the engine outlet B and the water inlet G of the radiator core whereby the heated water from the engine jackets must pass vertically downward toward the lower portion of the core D and thence upwardly into the core inlet G prior to admission into the cooling passageways and tubes of the core. A removable clean-out cap H is provided for lending access to the lowermost region of the passageway F for the purpose of removing the rust, scale and sludge permitted to accumulate therein.

Figure 1:
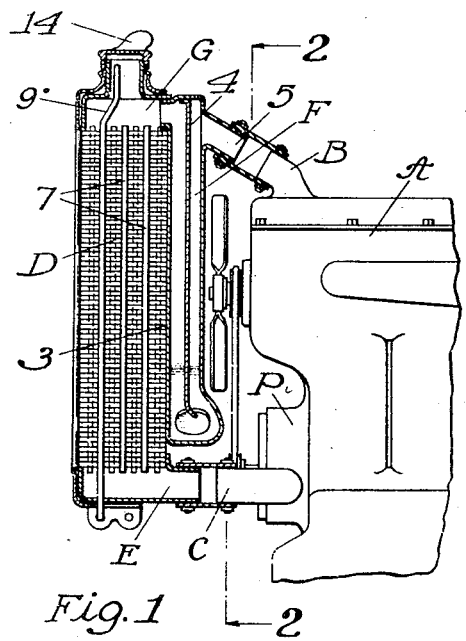
Figure 1 is a fragmentary elevation of a motor vehicle engine equipped with a cooling system incorporating features of our invention, the various parts of the cooling system being shown in section.
Figure 2:
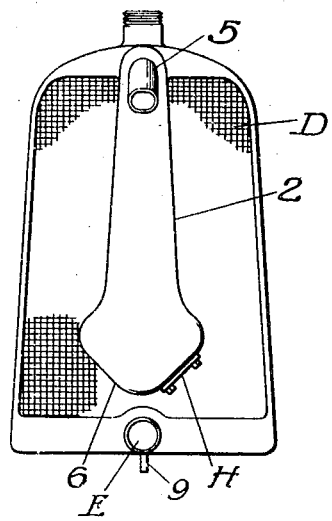
Figure 2 is a view substantially along the line 2—2 of Figure 1.

Referring particularly to Figures 1 and 2, the embodiment of the cooling system illustrated therein is one wherein the apparatus embodying the novel features of our invention may be installed in a motor vehicle, as an accessory, by the purchaser of the vehicle. This apparatus consists in an elongated hollow body 2, preferably of sheet metal, of sufficient length to extend along the rearward face of the radiator core D from the core inlet G to a point slightly above the core outlet E. The body 2 is relatively narrow in width (see Figure 2) for the major portion of its length so that but a small portion of the core D is covered. The forward wall 3 of the body 2 may contact directly with the adjacent and inner surface of the radiator core.

A partition wall 4 within the body 2, extending from its upper end to a point adjacent to its lower end, serves to establish the U shaped water conducting passageway F, whereby water from the engine outlet B admitted to the water inlet 5, of the body 2, must pass downwardly at the rearward side of the partition wall 4 to the lower and enlarged portion 6 of the body and thence upwardly along the wall 3 and into the radiator inlet G. Inasmuch as the vertical dimension of the passageway F is substantially that of the depth of the radiator core D; in most types of motor vehicles the radiator depth is from two to three and one-half feet, and by virtue of the relatively large cross sectional area of the passageway F and consequent reduced rate of flow therein, there is little possibility of dirt, rust, scale and sludge rising upwardly with the water stream from the lower region 6 of the body 2 and gaining access to the passageways and tubes 7 of the radiator core. A relatively free circulation of the water throughout the cooling system may therefore be maintained. Periodically the clean-out cap may be removed and the passageway F cleaned by withdrawing the accumulated sedimentary rust, sludge and other débris therefrom.

Another feature of the apparatus described is that of material assistance in re-establishing circulation of water throughout the cooling system in the event that water within the tubes 7 of the radiator core becomes frozen, as in extremely cold weather. Under ordinary circumstances it has been found that the freezing of the water in other portions of the cooling system, such as for instance in the water jackets of the motor and in the water passageway between the water jackets and radiator core does not take place in an amount sufficient to defeat circulation of the water under the force of the engine water pump P, but where free circulation is prevented it is, in practically every instance, due to the presence of solid ice within the tubes 7 of the radiator core. Under such a condition, and upon starting the engine A, warm water from the jackets often accompanied by steam, may pass through the passageway F so that heat therefrom may be transferred through the wall 3 of the body 2 directly to the core D, particularly at the lower portion of the core where freezing usually first occurs, thereby to sufficiently open the core tubes 7 to permit the warm water passing into the top of the radiator core to continue in its path downwardly therethrough. Even though but one of the tubes is thawed sufficient circulation may be established through the core to readily thaw the remainder.

At extreme low temperatures there are occasions where it may be expected that the water within the passageway F may become frozen in an amount sufficient to defeat the rupture of the ice by steam pressure generated after the engine is in operation. In anticipation of this condition we have illustrated in Figure 3 a modified form of the apparatus wherein a small bleed opening 8 is provided through the upper portion of partition 4 above the normal water level in the cooling system so that steam pressure within the water jackets may be relieved and the steam permitted free passage to atmosphere through an overflow pipe 9 extending directly through the radiator core as do the tubes 7 thereof. The opening 8 may be sufficiently small as to preclude the passage of rust, scale and other sludge therethrough under force of the water head as it is admitted to the inlet 5.

Figure 4:
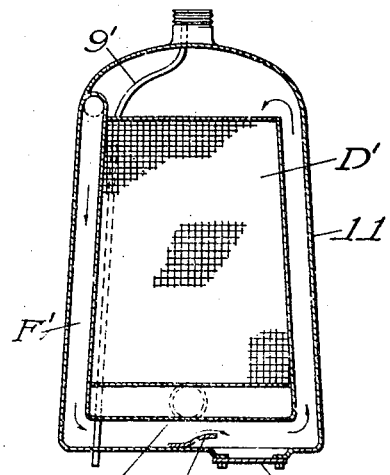
Figure 4 is a sectional view of a motor vehicle radiator illustrating another embodiment of our invention.

In Figure 4 we have shown another embodiment of our improvement in cooling systems wherein the passageway F' is preferably built into the radiator at the time the radiator is manufactured. The passageway F' is formed by placing an outer and water-tight shell 11 about the core D' and extends from the upper portion of the radiator at one side thereof downwardly across the bottom and up on the other side where the water is free to spill over into the radiator core. The clean-out cap H' may be located in the bottom wall of the shell 11 where a mechanic may have access thereto. A baffle 12 may be welded or otherwise fixed to the inner wall 11 slightly in advance of the clean-out cap H' so as to induce the accumulation of the sedimentary particles by eddy current in the vicinity of the cap.

Figure 3:
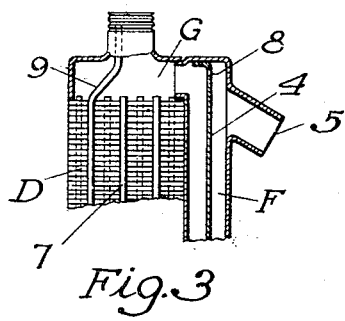
Figure 3 is a fragmentary sectional view illustrating a modified form of the apparatus of Figure 1.
Figure 5:
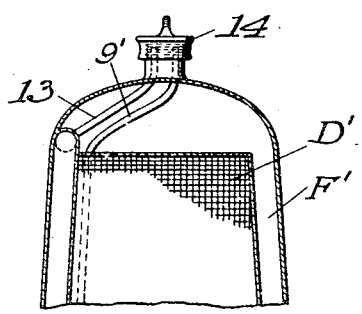
Figure 5 is a fragmentary view of a modified form of the apparatus of Figure 4.

In Figure 5, as in the case of the apparatus of Figure 3, we have illustrated means for venting steam in the event that the water within the passageway F' should become so solidly frozen as to preclude water circulation, as in extremely cold weather. For this purpose a vent tube 13 extends from the inlet end of the passageway F' upwardly to a point just within the radiator cap 14 above the normal water level where it may escape through the overflow tube 9'.

Figure 6:
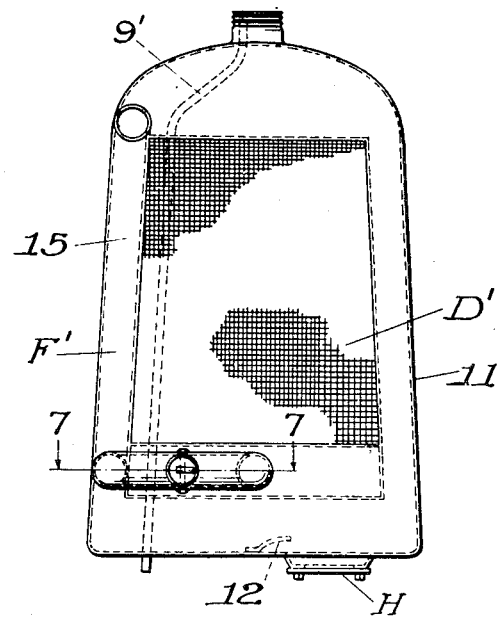
Figure 6 is a rear elevation partially in section of a motor vehicle radiator illustrating a further embodiment of our invention.
Figure 7:
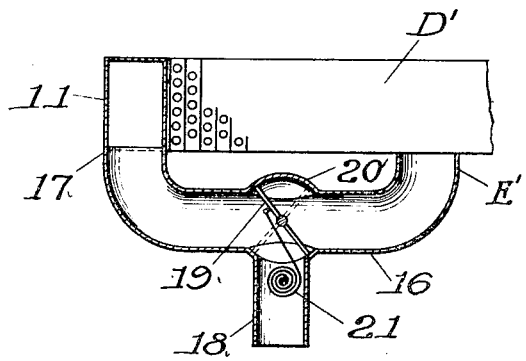
Figure 7 is a sectional view along the line 7—7 of Figure 6.

In Figures 6 and 7, we have illustrated another embodiment of our invention wherein water from the outlet B of the engine cooling jackets may by-pass the radiator core D' and be returned directly to the water inlet C of the engine by way of one leg 15 of the tortuous water conducting passageway F', thereby serving to transfer heat to the adjacent portions of the radiator core D', a function which in freezing weather may aid in the thawing of the radiator core passageways and tubes.

This feature of our improved water cooling system is made possible by the provision of a by-pass tube 16 having an internal cross section substantially equal to that of the passageway F'. One end of the tube 16 is connected with the radiator core outlet E' and the other end is connected at 17 with the portion 15 of the passageway F' at a point in juxtaposition with the bottom of the radiator core D'. A short length of tubing 18, communicating with the by-pass tubing at its mid-point, is provided for establishing fluid connection with the inlet port C of the engine water cooling system through the medium of a short flexible hose (not shown).

A butterfly valve 19 is mounted centrally within the tubing 16 in a spherically walled portion 20 in registration with the return tube 18 so that, when the valve is in the position shown in the full lines in Figure 7, water from the outlet B of the engine cooling system passing downwardly through a portion 15 of the passageway F' may be withdrawn through the return tube 18 directly to the engine water inlet C. At this time the normal water outlet E' of the radiator core D will be shut off from the engine inlet C, illustrated in form 7. When the valve is moved to the position shown in dotted lines in Figure 7, however, the course of the water from the engine outlet B must be that as described in connection with Figures 4 and 5, the by-pass being at this time inoperative.

In order that the valve 19 may respond to temperature changes of the engine cooling water, we have provided a thermostatic element 21 within the by-pass tubing 18 for maintaining the valve substantially in the position shown in full lines at temperatures below a predetermined temperature, thus to reduce further cooling of the water to a temperature below that in keeping with good engine performance. Thermostatic element 21 urges the valve toward the position shown in dotted lines as the temperature of the water rises above the said predetermined temperature.

Regardless of whether the water in the cooling system for the engine is travelling through the radiator core D' or is by-passed about the radiator, all of the water heated in the engine jackets must pass through the portion 15 of the passageway F', thus transferring heat to the adjacent portion of the radiator core D', whereby at least a small vertical section of the radiator core may be thawed so that when the water has been brought to a temperature at which passage through the core D' is justified, the radiator core, if initially frozen, will be thawed sufficiently to carry out its proper function of cooling the water.

It should be noted that, in this embodiment of our invention, even though the water is by-passed about the radiator, any heavy particles of sludge in the cooling system present in the portion 15 of the passageway F' may fall into the horizontal portion of the passageway to be subsequently conveyed over the baffle 12 in the manner described in connection with the preceding figures of the drawings.

We claim:

1. In combination, an internal combustion engine of the water-cooled type having a water jacket, a substantially upright water cooling radiator and means providing a water circulating passageway between said engine jacket and said radiator, a portion of said passageway being substantially U-shaped, said U-shaped portion of the passageway having a vertical depth substantially equal to the depth of the radiator.

2. In combination, an internal combustion engine of the water-cooled type having a water jacket, a substantially upright water cooling radiator, means providing a water circulating passageway between said engine jacket and said radiator, a portion of said passageway being substantially U-shaped, said U-shaped portion of the passageway having a vertical depth substantially equal to the depth of the radiator, and a removable clean-out cap located at the lower end of said U-shaped portion of said passageway.

3. In combination, an internal combustion engine of the water-cooled type having a water jacket, a water cooling radiator including a plurality of relatively small passageways through which the water passes to give off its heat, and means providing a water circulating passageway between said engine jacket and the passageways of said radiator, said water circulating passageway including a substantially U-shaped portion having a cross sectional area throughout which is greater than the cross sectional area of the radiator passageways and of the remainder of said water circulating passageway whereby the velocity of flow in the U-shaped portion is reduced.

4. In combination, an internal combustion engine of the water-cooled type having a water jacket, a radiator for cooling the water in said water jacket, means providing a water circulating passageway between the engine and the radiator, said passageway extending downwardly on one side of the radiator, across the bottom thereof and upwardly upon the other side to form a trap in that portion thereof in which water flows from the water jacket to the radiator.

5. In combination, an internal combustion engine of the water-cooled type, a water cooling radiator for radiating heat transferred to the water in the water jackets of said engine, and means for transferring a portion of the heat imparted to the water in said water jackets to the lower portion of the radiator prior to the admission of the water to the radiator for normal cooling, said means including a passageway extending from the outlet end of said water jacket to the inlet of said radiator through which all water admitted to said radiator must first pass.

6. In combination, an internal combustion engine of the water-cooled type, a water cooling radiator for radiating heat transferred to the water in the water jackets of said engine, and means for transferring a portion of the heat imparted to the water in said water jackets to a portion of the radiator prior to the admission of the water to the radiator for normal cooling, said means including a passageway through which all water admitted to the radiator must first pass, the walls of which contact the heat radiating elements of said radiator.

7. In combination, an internal combustion engine of the water-cooled type having a water jacket, a substantially upright water cooling radiator, and means providing a water circulating passageway between said engine jacket and said radiator, a portion of said passageway being substantially U-shaped, said U-shaped portion of the passageway having a vertical depth substantially equal to the depth of the radiator, at least a portion of said U-shaped passageway being disposed in close proximity to the inner wall of said radiator below the mid-portion thereof whereby heat will be transferred from the water in the passageway to the water within the radiator.

8. In combination, an internal combustion engine of the water cooled type having a water jacket, a water cooling radiator having an inlet means providing a tortuous water conducting passageway between said engine water jacket and said radiator inlet, at least a portion of said passageway being located in close proximity to the lower region of said radiator.

9. In combination an internal combustion engine of the water-cooled type having a water jacket, a water cooling radiator having an inlet, means providing a tortuous water conducting passageway between said engine water jacket and said radiator inlet, at least a portion of said passageway being located in close proximity to the lower region of said radiator, means providing a vent opening between the upper part of the cooling radiator and said passageway at a point in the passageway above the normal water level thereof and a tube leading from the upper part of the cooling radiator to atmosphere in heat exchange with the entire length of the cooling radiator.

10. In combination, an internal combustion engine of the water-cooled type having a water jacket, a water cooling radiator having an inlet, means providing a tortuous water conducting passageway between said engine water jacket and said radiator inlet, at least a portion of said passageway being located in close proximity to the lower region of said radiator, and means providing a vent opening between the atmosphere and said passageway at a point in the passageway above the normal water level thereof, said first named means including a tube contacting substantially throughout its length, with the heat radiating members of said radiator.

11. In a cooling system for internal combustion engines, a fluid cooling radiator, and means providing an inlet passageway for said radiator, at least a portion of said passageway being located immediately adjacent to a section of the radiator core along the normal flow of fluid through the radiator.

12. In a cooling system for internal combustion engines, a fluid cooling radiator, means providing an inlet passageway for said radiator, at least a portion of said passageway being located immediately adjacent to a section of the radiator core along the normal flow of fluid through the radiator, said passageway being substantially U shaped, and a drain cap located in the lowermost portion thereof.

13. In combination, an internal combustion engine of the water-cooled type, a water cooling radiator for radiating heat transferred to the water in the water jackets of said engine, means for transferring a portion of the heat imparted to the water in said water jackets to a portion of the radiator prior to the admission of the water to the radiator for normal cooling, and temperature operated means for by-passing the cooling water about said radiator back to said water jacket subsequent to the transfer of heat to the said portion of the radiator until the temperature of the water rises above a predetermined degree.

14. The system of claim 11 which also includes a by-pass connected to said passageway and a thermally operated valve for controlling the flow of fluid through said passageway and said by-pass.

EDWARD R. BARNARD.
JOHN OVERTON EISINGER.